United States Patent
Maehlmann et al.

(10) Patent No.: US 8,894,317 B2
(45) Date of Patent: Nov. 25, 2014

(54) BALL JOINT AND METHOD FOR THE PRODUCTION THEREOF

(75) Inventors: Dirk Maehlmann, Vechta (DE); Frank Schmeink, Neuenkirchen-Vorden (DE); Benjamin Ziebart, Wallenhorst (DE); Horst Pott, Espelkamp (DE); Christian Rziczny, Neuenkirchen (DE); Michael Heuer Gen Hallmann, Ostercappeln (DE); Philippe Milos, Damme (DE); Wolfgang Kleiner, Wagenfeld (DE); Reinhard Buhl, Bohmte (DE); Jurgen Schmitz, Karlshuld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 170 days.

(21) Appl. No.: 13/140,475

(22) PCT Filed: Dec. 15, 2009

(86) PCT No.: PCT/DE2009/050073
§ 371 (c)(1),
(2), (4) Date: Aug. 15, 2011

(87) PCT Pub. No.: WO2010/069304
PCT Pub. Date: Jun. 24, 2010

(65) Prior Publication Data
US 2011/0293359 A1 Dec. 1, 2011

(30) Foreign Application Priority Data

Dec. 19, 2008 (DE) .......................... 10 2008 063 813

(51) Int. Cl.
*F16C 11/06* (2006.01)
(52) U.S. Cl.
CPC ................... *F16C 11/0633* (2013.01)

USPC .......................................... 403/135; 403/133
(58) Field of Classification Search
USPC ................. 403/114–116, 122, 135, 133, 140; 464/173, 175; 277/630, 634
See application file for complete search history.

(56) References Cited

U.S. PATENT DOCUMENTS 1,050,422 A * 1/1913 Birchwood ................... 29/441.1
3,650,004 A * 3/1972 Bergstrom ................. 29/898.01
(Continued)

FOREIGN PATENT DOCUMENTS

| DE | 34 19 871 A1 | 11/1985 |
|---|---|---|
| DE | 195 36 035 A1 | 4/1997 |

(Continued)

*Primary Examiner* — Daniel P Stodola
*Assistant Examiner* — Jonathan Masinick
(74) *Attorney, Agent, or Firm* — Davis & Bujold, PLLC; Michael J. Bujold

(57) ABSTRACT

A ball joint with a housing formed entirely by a cold forming method. The housing having an inner chamber for receiving the joint ball of a ball pin and an opening through which the ball pin extends, and a contact area on the outer surface area of the housing forms a seal with a bellows. A forming section of the housing secures the joint ball within the inner chamber such that the joint pall can both rotate and pivot. Following completion of the housing, the material displaced during the cold forming method creates the forming section of the housing. The method for producing a ball joint comprises the steps of producing a metallic housing blank with a thickening formed by compression, forming the outer contour of the housing by compression, shaping the inner contour of the housing through dishing, and using the displaced material for creating the forming section.

25 Claims, 10 Drawing Sheets

(56) References Cited

U.S. PATENT DOCUMENTS

| | | | |
|---|---|---|---|
| 3,802,789 A * | 4/1974 | Patton et al. | 403/135 |
| 4,681,475 A * | 7/1987 | Kanegawa | 403/40 |
| 5,852,864 A * | 12/1998 | Krude et al. | 29/437 |
| 5,997,208 A | 12/1999 | Urbach et al. | |
| 6,044,543 A | 4/2000 | Dorth et al. | |
| 6,213,675 B1 | 4/2001 | Ungruh et al. | |
| 6,735,997 B2 | 5/2004 | Rosenberger et al. | |
| 7,357,591 B2 * | 4/2008 | Broker et al. | 403/132 |
| 2003/0077114 A1 * | 4/2003 | Broker et al. | 403/135 |
| 2003/0081989 A1 * | 5/2003 | Kondoh | 403/135 |
| 2006/0127168 A1 * | 6/2006 | Kondoh | 403/122 |
| 2006/0153632 A1 * | 7/2006 | Bernhardt et al. | 403/122 |
| 2008/0138150 A1 * | 6/2008 | Budde et al. | 403/135 |
| 2009/0279944 A1 | 11/2009 | Schmitz et al. | |
| 2012/0020723 A1 * | 1/2012 | Schmitz et al. | 403/122 |

FOREIGN PATENT DOCUMENTS

| | | |
|---|---|---|
| DE | 197 55 020 A1 | 6/1999 |
| DE | 101 00 668 A1 | 7/2002 |
| DE | 10 2006 016 060 A1 | 10/2007 |
| JP | 58-112626 A | 7/1983 |
| JP | 59-010440 A | 1/1984 |

* cited by examiner

BALL JOINT AND METHOD FOR THE PRODUCTION THEREOF

This application is a National Stage completion of PCT/DE2009/050073 filed Dec. 15, 2009, which claims priority from German patent application serial no. 10 2008 063 813.7 filed Dec. 19, 2008.

FIELD OF THE INVENTION

The invention relates to a ball joint as well as to a method for manufacturing a housing for a ball joint and a method for manufacturing a ball joint of this kind.

BACKGROUND OF THE INVENTION

A method for the manufacture of a housing for a ball joint, particularly for a vehicle's tie rods, and a housing for a ball joint manufactured using this method is known from patent DE 195 36 035 AI, forming this patent family. The housing has an adapted inner space to house the joint ball of a ball pin. The housing, which initially is open on both sides, is later closed on one side with a cover, whereby there is a shaped section on the upper edge of the housing for attaching the cover. The housing is closed with a cover once the ball pin, together with a bearing shell that houses the joint ball, has been placed in the inner chamber of the housing. The pin portion of the ball pin extends out of the opening in the housing on the side opposite the cover. A sealing bellows is provided to seal the inner joint components, whereby a marginal area of this sealing bellows forms a seal with the contact area of the surface of the outer casing of the housing. In the case of the solution known from DE 195 36 035 AI, the side with the opening for the passage of the pin portion of the ball pin has a contact shoulder, on which the bearing shell placed inside is supported.

In addition, DE 34 19 871 A1 has a housing to receive a joint ball, which, as a blank, has an interior space for receiving the joint ball that has a spherical shape on one side and, on the side opposite this spherical shape, an internal circular-cylindrical bead. After the joint ball is inserted, the beaded edge of the housing is deformed radially inward by a cold forming method using a pressing tool so that the joint ball is fixed in the housing. In the case of this solution, subsequent heat treatment is needed in order to restore the mobility of the ball joint. The manufacturing cost for producing such a ball joint is significant.

Also known from DE 197 55 020 A1 is a ball joint engineered as an axial ball joint, the housing of which has an inner chamber adapted for housing a joint ball of a ball pin as well as an opening to allow the passage of the pin portion of the ball pin connected to the joint ball. A bearing shell is inserted in the inner chamber of the housing, which receives the joint ball. The bearing shell and the housing have an open-sided, circular-cylindrical geometry with a constant wall thickness. After inserting the bearing shell, and the joint ball on the ball pin inserted therein, into the housing, the existing opening in the housing is deformed, to a limited degree, in the direction of the middle of the housing in order to prevent the ball pin from loosening itself from the housing, and the bearing shell is brought up against the surface of the joint ball.

The deformation of what was originally a circular-cylindrical housing into an area, which abuts the edge portion of a sealing bellows after completion of the ball joint, was recognized as a disadvantage of this solution. This may result in damage to the permanent, fixed position of the sealing bellows resulting in a risk that moisture and contaminates may penetrate into the inner joint parts.

SUMMARY OF THE INVENTION

The object of the invention is to provide a ball joint that can be manufactured inexpensively, saving time, materials and energy.

A ball joint with a housing or joint housing manufactured entirely with a cold forming method, that has an inner chamber adapted for housing the joint ball of a ball pin as well as an opening on one side to allow the passage of the pin portion of the ball pin connected to the joint ball and a contact area on the external surface of the housing in order to form a seal with a bellows edge as well as a closure area on the housing for the rotating and moving attachment of the joint ball on the ball pin in the inner chamber, was further developed according to the invention such that the material displaced by the cold forming, or during the cold forming process, forms the forming section of the housing after the completion of the housing.

The solution provided by the invention makes it possible to manufacture a ball joint largely without machining and therefore producing virtually no waste and with only a few steps. Excess material is not removed, but rather is used for the formation of a special forming section on the manufactured housing that is significant to the invention. This forming section forms a closure area in a joint housing that will form the joint closure of the completed ball joint after the cold forming, for example by pressing or rolling. The boring performed during manufacturing of the housing in other embodiments known from the prior art, and the loss of material that accompanies this can be completely eliminated. In this way the processing time for machining, energy, and valuable material can be saved. This eliminates the reprocessing or the removal of the waste material that is otherwise required. The production costs for this kind of ball joint are thereby substantially reduced compared with known solutions. This is achieved by balancing the material mass tolerance using a defined material overflow during the shaping of the housing blank through material displacement.

In the solution presented by the invention, components such as a cover plate or a lock ring and additional work steps such as fixing the cover plate or lock ring when closing the ball joint may be eliminated as a result of the one-piece embodiment of the housing that has an opening on only one side.

In one embodiment of the invention, the forming section for sealing the housing can be produced or shaped using a cold forming method such as pressing or rolling. These known manufacturing processes turn out to be particularly advantageous as an inventive solution because they are energy efficient and therefore cost-effective, and because the production cost is low. The nearly cutting-free production also eliminates changeover times on machines and machining is virtually eliminated. In addition, the assembly of a ball joint that uses the housing according to the patent is simplified.

It may also be advantageous if the forming section has the geometry of a hollow circular cylinder, taper or cone before shaping. It follows that the forming section has a form that simplifies the shaping of the forming section and also makes it possible to achieve an optimal position of the forming section on the ball joint or of the joint ball in the bearing region after inserting the joint ball of the ball pin.

The conical or cone-shaped line of the forming section can be designed in such a way that the taper or cone is provided on the outer contour of the housing.

In accordance with the further development of the invention, a substantial advantage can be obtained with the provided characteristic that the shaped area of the forming section, which is to say the closure area, has a largely spheroidal form after is shaping. Thus when the ball joint is closed, the bearing shell is shaped by the closure area in such a way that it is optimally couched against the joint ball. In this way, overall higher contact ratios can be reported in the ball joint which means a higher loading capacity. This effect can be reinforced even further if the inner chamber of the housing, and thus also the bearing shell, have an overall spheroidal shape.

The advantage of producing the housing a cold forming method also lies in the fact that when shaping the housing, a variety of contours can be created. In accordance with another suggestion of the invention, it is therefore intended that the housing have a tool contact surface on its lower surface opposite the opening.

It is equally advantageous that an adjustment flange can be formed on the lower surface opposite the opening in the housing during the shaping, for example. It is also possible to use excess material for the formation of the tool contact surface and/or the adjustment flange so that no waste is produced.

Tool contact surfaces and/or adjustment flanges are used to affix the housing in or on a receiving tool during the later assembly of the ball joint. This makes assembly easier and therefore improves the quality of the assembly.

The adjustment flange can be designed as an annular, circular or polygonal projection. It is only significant that it represents a projection on the lower surface of the housing that can be inserted into a corresponding receptacle on the tool, in order to secure the housing during assembly.

As is familiar in many ball joint designs, it is possible to insert a bearing shell into the inner chamber of the housing in the ball design according to the present invention so that the holding properties of the ball joint can be affected specifically.

In order to facilitate the assembly of the ball joint, it is advantageous if the bearing shell has a substantially consistent wall thickness and is already spheroid before the assembly of the ball joint or, in other words, has a spherical shape. In this way, it is possible to position the bearing shell immediately on the joint ball of the ball pin outside of the housing and subsequently be inserted into the housing with the ball pin as a preassembled unit. In addition, the spheroid embodiment makes it possible to achieve a higher load capacity as has already been indicated above with the similarly shaped spheroid forming section.

One embodiment of the invention is also designed so that the bearing shell has a stronger material cross section in the area of the opening edge than in a section through which a plane extends through the mid-point of the joint ball and perpendicular to the longitudinal axis of the non-deflected ball pin.

The amount of the adjustment to the forming section is reduced considerably by these characteristics. This means that there is less overall deformation of the external surface of the housing so that especially the contact area for the sealing bellows edge is nearly uninfluenced by the deformation process for closing the housing. Thus, this contact area can be very precisely designed and can guarantee a reliable and secure seal between the sealing bellows edge and the housing.

There is another advantage in the fact that the bearing shell has at least two areas with differing material cross sections, a thinner section approximately in the middle of the joint ball and a reinforced section in the area of its opening edge. This makes it possible to obtain an optimum stress distribution within the bearing shell for the stress forces on the bearing shell associated with the shaping. As a result, the bearing shell of a ball joint according to the invention is adjusted to the surface of the joint ball in such a way that the friction coefficients of the joint ball-bearing shell component pairing are very low. In this way, the wear to the ball joint can be reduced to a considerable extent.

The opening edge of the bearing shell may, for example, be formed at least partially as a reinforced bead.

A particular problem in ball joints known from the prior art is ensuring that the bearing shell does not come loose within the inner chamber of the housing over the life span of the ball joint and, for example, move inside the inner chamber. A ball joint of this type would quickly become unusable. Here again, a further proposal of the invention provides a solution. Thus there is at least one projection inside the housing in order to prevent the bearing shell from rotating. This projection can be created in various ways. Thus it is sufficient to produce a deformation of the material inside the housing, the dimensions of which are only a few tenths of a millimeter, so that this projection penetrates the bearing shell material when the bearing shell is inserted into the housing and thereby secures the bearing shell, which functions particularly well to prevent rotation. It is particularly advantageous if at least one projection has already been created during the production of the housing.

According to an advantageous further embodiment of the invention, the housing has a lug on the outer contour of the housing that acts as a contact area to form a seal with the sealing bellows edge and that is formed by various material cross sections of the contact area and forming section. The reinforced contact area in its cross section opposite the forming section is unaffected by the shaping so that the design of the contact area can be very precisely adjusted to the dimensions of the sealing bellows edge. The forming section and the area where the sealing bellows edge forms a seal are separated from one another in terms of the metal formation process as a result of the graduation in the open-sided section of the housing. The shaping of this kind of housing is therefore substantially simplified during the assembly of the ball joint as compared with solutions known from the prior art. The seal was decisively improved by the inventive measures in terms of its reliability and durability.

Also significant to the embodiment of the contact area and the forming section is the fact that the outer diameter of the forming section is smaller than the outer diameter of the contact area for the sealing bellows edge, so that the forming section has a smaller material cross section as compared with the contact area and the geometry of the housing interior can be constructed without transitions.

It is advantageous that the closure area created from the forming section using a cold forming method has a beveled surface at the edge of the opening after its formation, which corresponds to the geometry of the pin portion of the ball pin in this area; in other words, in its final form as the closure of the ball joint. This advantageous embodiment makes it possible to attain a linear contact on the housing with the maximum deflection of the ball pin to one side. As compared with a point of contact, this linear contact has the advantage of having a very low notch effect so that the surface of the ball pin is not damaged even in the case of repeated contact. This is especially important if the ball pin has a surface protection.

Another embodiment of the invention is that there is a transition area between the forming section and the contact area. This measure ensures that the smoothest possible transition is created between the contact area for fixing the sealing bellows edge and the forming section. After the completion of the ball joint equipped with a housing according to the invention, the transition area is no longer or scarcely recognizable. Preferably, it adjusts precisely to the forming section during its shaping.

A further proposal of the invention provides that the transition area is formed by at least one radius. It is preferable, however that there be multiple radii that fluidly merge into one another in the transition area. This fluid transition created by the radii between the forming section and the contact area for attaching the sealing bellows edge also eliminates any sharp transitions on the housing. These kinds of sharp transitions might lead to damage to the essential area where the sealing bellows edge meets to seal the ball joint.

In a special variant of the housing according to the invention, the contact area for the sealing bellows edge has a circular-cylindrical, tapered or conical shape. In the case of the preferred circular-cylindrical shape of the contact area, a surface is provided that allows an optimum sealing effect between the contact area and the sealing edge on the adjacent sealing bellows edge.

The conical or tapered shape of the contact area can also further improve the sealing contact of the bellows edge or aid in preventing the sealing bellows edge from coming loose from the contact area.

In addition, sealing contours such as serrated structures are possible so that it is possible for the contact area to mesh with the sealing bellows edge.

A particularly advantageous further embodiment of the invention consists in the fact that the contact area for the sealing bellows edge is allocated in a section of the housing in which a plane extends through the mid-point of the joint ball and perpendicular to the longitudinal axis of the non-deflected ball pin.

This accordingly existing contact for the sealing bellows edge approximately in the middle of the housing makes it possible to attain an optimum seal. The tensile stress exerted on the sealing bellows as a result of the pivoting of the ball pin or the torsion that stresses the sealing bellows can largely be compensated for using these measures. In this case, the sealing bellows is long enough to allow it to be arranged helically with multiple folds so that it can compensate for the aforementioned movement with its inherent elasticity and will not come loose from its contact area.

It is especially advantageous for radial joints if the contact area for the sealing bellows edge is provided at a height approximately in the center of the joint ball. Such radial joints generally have a shaft that extends laterally from the housing which later serves to connect the housing with corresponding components. In terms of the longitudinal axis of the non-deflected ball pin, this radial shaft is directly connected to the contact area for the sealing bellows edge. It has been established that the connection of the shaft in radial joints is associated with lower bending stresses under load as a result of the embodiment of the housing according to the present invention. This represents another very important advantage of the described embodiments.

In particular, the contact area for the sealing bellows edge can run nearly parallel to the longitudinal axis of the non-deflected ball pin. In other words, the contact area forms a contour that can establish optimum contact with the sealing bellows edge. The taper of the sealing bellows edge can vary here in a range of 0°-5°, whereby the taper runs into the interior of the pin or the longitudinal axis of the non-deflected ball pin. Here again, the manufacture of the housing a cold forming method proves to be advantageous, since the contact area can be entirely formed during the creation of the housing without the need for machining.

In terms of connecting the housing to a shaft, as may be provided in radial joints, in addition to a single-part or one-piece construction of housing and shaft, it is also possible, according to the present invention, that a shaft subsequently attached to the housing through deformation of the material or welding be provided.

A special embodiment of the housing has a slot in the top view after its closure. The forming section of the housing has two diametrically opposed, recessed edge sections and two raised edge sections between these in order to be able to form the slot through the cold forming of the closure area from the forming section in a single production step.

The method for manufacturing the housing for a ball joint is comprised of the following steps:
Production of a metal housing blank 25 with a bulge 26 formed through cold forming,
Formation of the outer contour of the housing 27 through cold forming,
Shaping of the inner contour of the housing 28 through cold forming, wherein the material displaced by the particular cold forming method forms a sealing bellows edge 8 and the forming section 9 in such a way that a circumferential, malleable closure area 9 is created by the forming section 9.

The method for the production of a ball joint to which the invention relates is characterized by the following steps:
Production of the integrated cold-formed joint housing 1,
Shaping of the inner contour of the housing 28 through cold forming, wherein the material displaced by the particular cold forming method forms a sealing bellows edge 8 and the forming section 9 in such a way that a circumferential closure area 9 through cold forming is created after inserting the joint ball 2 of the ball pin in the inner chamber 4.

In so doing, according to a continuation of these basic process steps, a tool contact surface and/or an adjustment flange may be formed on the lower surface of the housing during the dishing.

At least one projection can be formed to prevent the rotation of the bearing shell by displacement of material using a tool in the inner contour of the housing without considerable additional expense.

The cold forming method used in the manufacture of the housing in accordance with the invention is preferably a cold extrusion process because this allows the housing to be produced with nearly almost no machining.

BRIEF DESCRIPTION OF THE DRAWINGS

The invention will be explained in greater detail below with the aid of the accompanying drawings. The sample embodiments shown do not represent a limitation to the illustrated variants, but rather only serve to illustrate the principle of the invention. The figures only show highly simplified schematic representations in which unessential parts or components are not depicted in order to be able to illustrate the way in which the invention functions. This does not mean that such parts or components are not present in the solution according to the invention.

Depicted are.

DETAILED DESCRIPTION OF THE PREFERRED EMBODIMENTS

Figure 1:
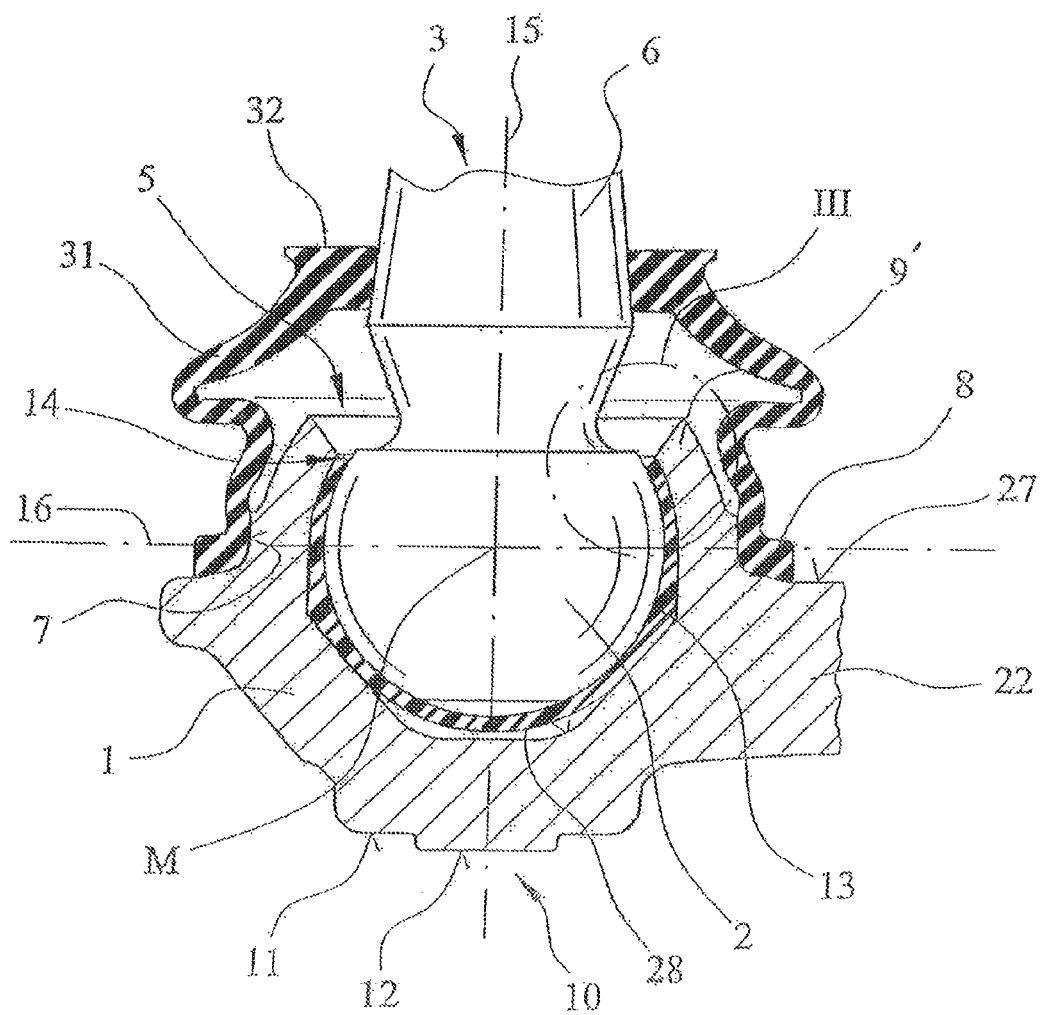
FIG. 1: a detail of the head area from a first embodiment of a completely assembled ball joint in cross section.

FIG. 1 shows a completely assembled ball joint in cross section. The housing 1 has a radially protruding shaft 22, by means of which it is possible to attach the housing 1 to a corresponding component of a vehicle. There is a bearing shell 13 inserted into an inner chamber 4 in the housing 1, which can be seen clearly in FIG. 4 or FIG. 5, which lies at large sections of the outer surface of the bearing shell in immediate contact with the inner contour of the housing 28 in the inner chamber 4. In this embodiment of the ball joint, the inner contour of the housing 28 has beveled surfaces on which the bearing shell 13 is supported with corresponding bevels. The plastic bearing shell 13 has limited elastic characteristics, and in the aforementioned case, with a spherical inner shell surface in the aforementioned case, holds the joint ball 2 of a ball pin 3. In the illustration in FIG. 1, the ball pin 3 is shown in a non-deflected position. Originating from the joint ball 2, the ball pin 3 transitions to a pin portion 6, which protrudes out of an opening 5 in the housing 1. A sealing bellows 31 seals the inner joint components from the environment. It has an initial sealing bellows edge 8 and across from it, a second sealing bellows edge 32, which comes into direct contact with the pin portion 6 of the ball pin 3. The sealing bellows edge 8 forms a seal with contact area 7 on the outer contour 27 on the housing 1. This contact area 7 of the housing 1 has a greater diameter than that of the forming section 9 and the resulting joint closure 9' that is attached, in the direction of the opening 5, to the housing 1.

In the example shown, the forming section 9 is deformed in the direction of the joint center, in other words towards the mid-point M, in order to secure the joint ball 2 and the bearing shell 13 in the housing 1 of the ball joint.

In the representation in FIG. 1, it is also of importance that the sealing bellows edge 8 is located in a plane 16 that runs perpendicular to the longitudinal axis 15 of the non-deflected ball pin 3 and also through the mid-point M of the joint ball 2. Thus the sealing bellows edge 8 is oriented approximately at the middle of the joint, which has the substantial advantage that it can compensate optimally for the loads generated by the movement of the ball pin 3 within the housing 1. In this area, the bearing shell 13 also has a smaller material cross section than at the edge of its opening 14. There is also a tool contact surface 11 as well as an adjustment flange 12 formed on the lower surface 10 of the housing 1, which are created when the housing is produced.

Figure 2:
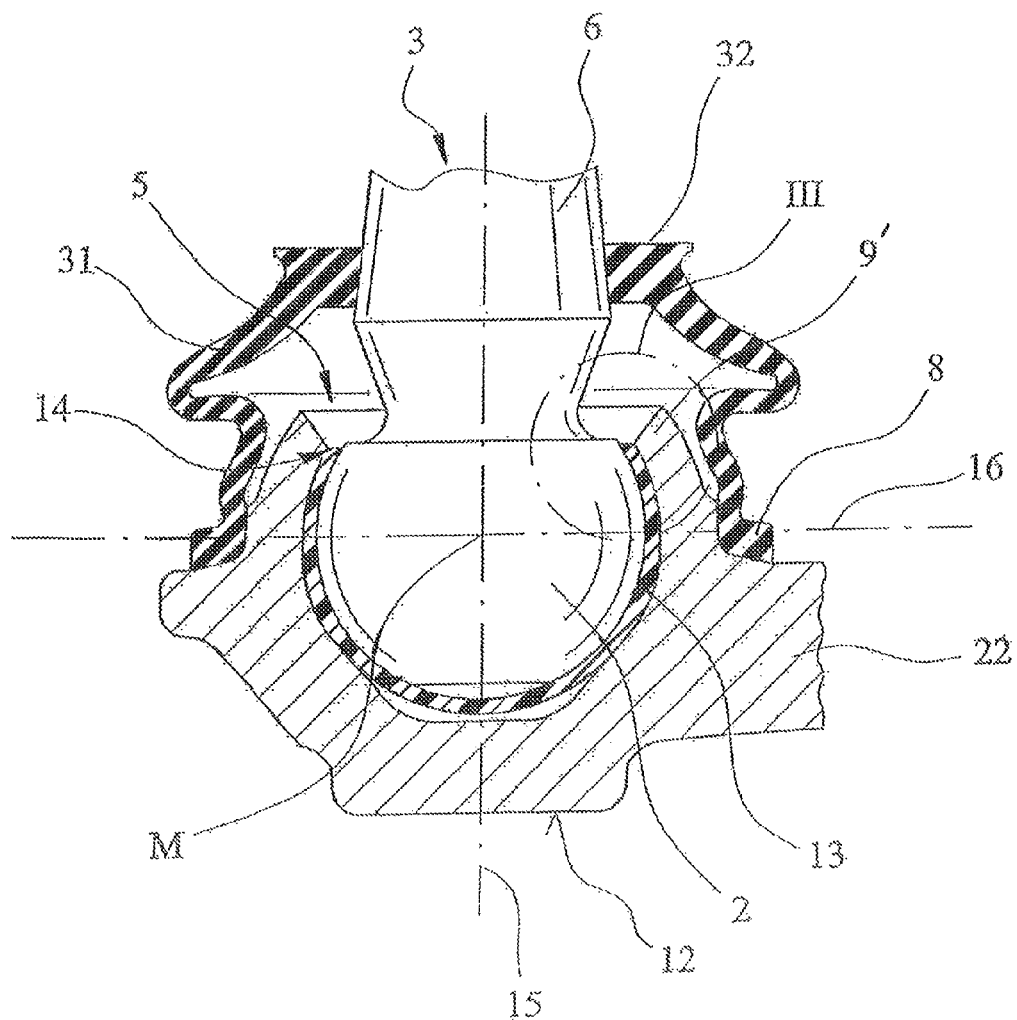
FIG. 2: a detail of the head area from a second embodiment of a completely assembled ball joint in cross section.

In contrast to FIG. 1, the embodiment of the ball joint in FIG. 2 features a bearing shell 13 that has a nearly constant material cross section over its entire circumference. Only the opening edge 14 is reinforced as in the ball joint in FIG. 1. This spheroid contour is also adjusted to the inner chamber 4 of the housing 1, which has also been designed to be spherical. These measures make it possible to reach a substantially higher percentage contact area, which means that these ball joints are more durable than known embodiments. In addition, in the variant in FIG. 2, the lower surface 10 of the housing 1 is designed as a tool contact surface 11, which serves as an adjustment flange 12.

Figure 3:
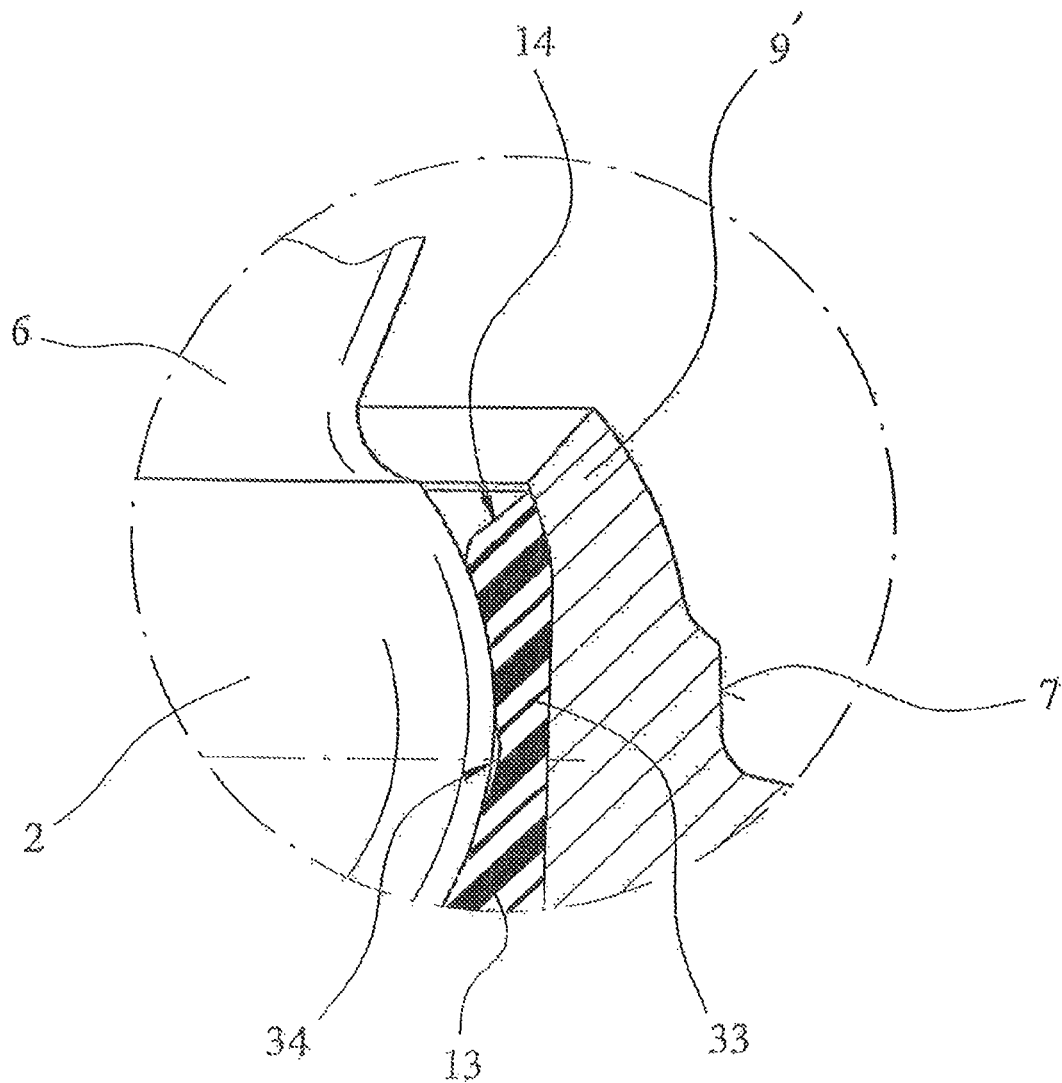
FIG. 3: the enlarged detail III from FIG. 1 or from FIG. 2, FIG. 4: a first variant of the housing as a single part and in partial section.

The enlarged section III from FIGS. 1 and 2 is shown in FIG. 3. This shows that the bearing shell 13 features a thickening at the edge of its opening 14 and a very narrow contour in the bearing shell section 33 near the equator. Because of the thickened edge of the opening 14 in the bearing shell 13, the forming section 9 of the housing 1 only needs to be shaped to a small extent, so that the shaping has no impact on the adjacent contact area 7 of the housing 1. The contact area 7 can therefore be very precisely adjusted for the contact with the sealing bellows edge.

Clearly visible in FIG. 3 are the recesses 34 on the inside of the bearing shell 13, in the area of contact with the joint ball 2.

Figure 4:
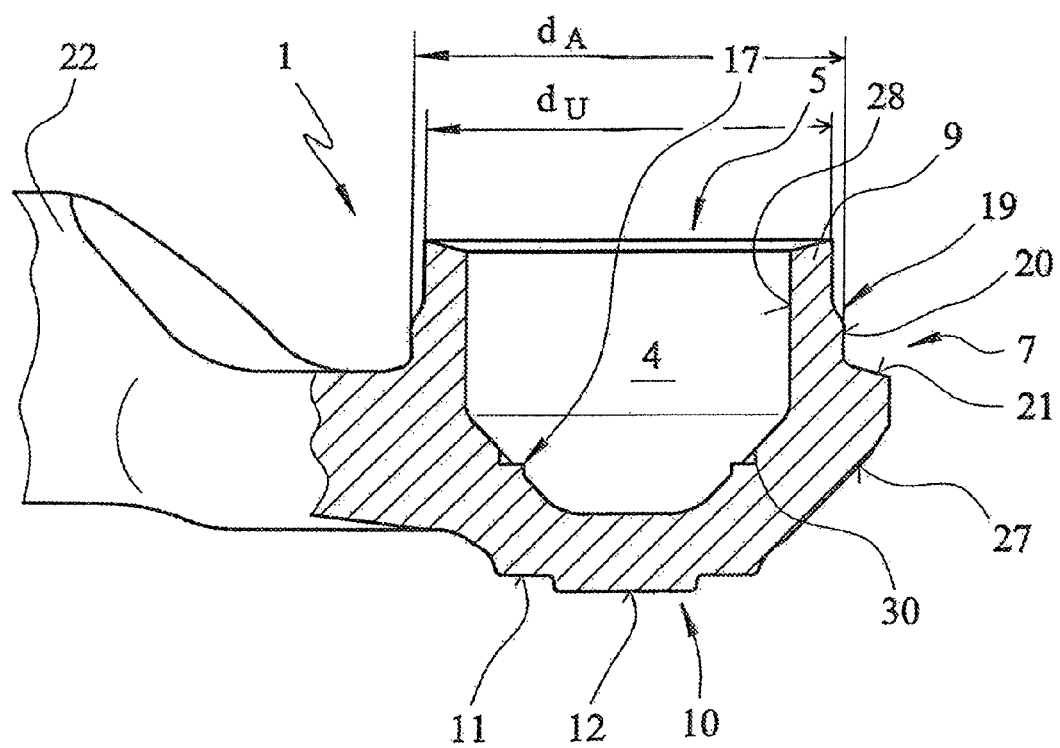

In the first embodiment of a housing 1 as a single part, shown in FIG. 4, there is an inner chamber 4 that is shaped as a receptacle for the joint ball 2 of the ball pin 3, as well as the bearing shell 13 that holds the joint ball 2. The housing 1, as a housing 1 open on one side, has an opening 5. An assembly consisting of the ball pin 3 and the bearing shell 13 placed on the joint ball 2 of the ball pin 3 can be inserted into the housing 1 through this opening 5 during the assembly of the ball joint. In the opening-side area the housing 1 features the contact area 7 for establishing a seal with a sealing bellows edge 8 (not shown here) on the outer contour of the housing 27. In this case, this contact area 7 is comprised of two sections, namely an axial section 20, which transitions into a slope section 21. The axial section 20 and slope section 21 form a V-shaped contact area 7, which has an obtuse angle as an opening angle. The axial section 20 is a circular-cylindrical contact surface and therefore has a diameter of $d_A$.

Viewed in the direction of the opening 5, the forming section 9 is connected to the contact area 7, which secures the joint ball 2 in the inner chamber 4 through a deformation to the center point of the joint after the joint ball 2 of the ball pin 3 has been inserted into the inner chamber 4 of the housing 1. The forming section 9 is shaped in such a way that the joint ball continues to be able to rotate and pivot within the inner chamber 4. It is particularly advantageous if the shaping is performed while simultaneously measuring the section modulus so that the adjusting friction values between the joint ball and the bearing components can be determined and therefore the ball joint being produced will have precisely definable friction values.

The outer diameter $d_U$ of the forming section 9 is clearly smaller than the outside diameter $d_A$ of the contact area 7, as is evident from the illustration in FIG. 4, so that the contact area 7 is not affected during the shaping of the forming section 9. There is a transition area 19 between the contact area 7 and the forming section 9, which consists of multiple, fluidly merging radii. In order to avoid sharp transitions, it is preferable that radii are used in this section of the housing 1 so that a harmonic and flowing transition between the individual housing sections is created.

In addition there are multiple projections 17 in the inner contour 28 of the inner chamber 4 of the housing 1 that are formed by a displacement of material so that there are recesses 30 immediately adjacent to the projections 17. The projections serve to prevent the bearing shell from rotating when the ball joint is assembled later.

An additional feature of this housing 1 is that a tool contact surface 11 and an adjustment flange 12 as a central projection are formed on the lower surface 10, which helps to optimize the assembly of the ball joint.

Figure 5:
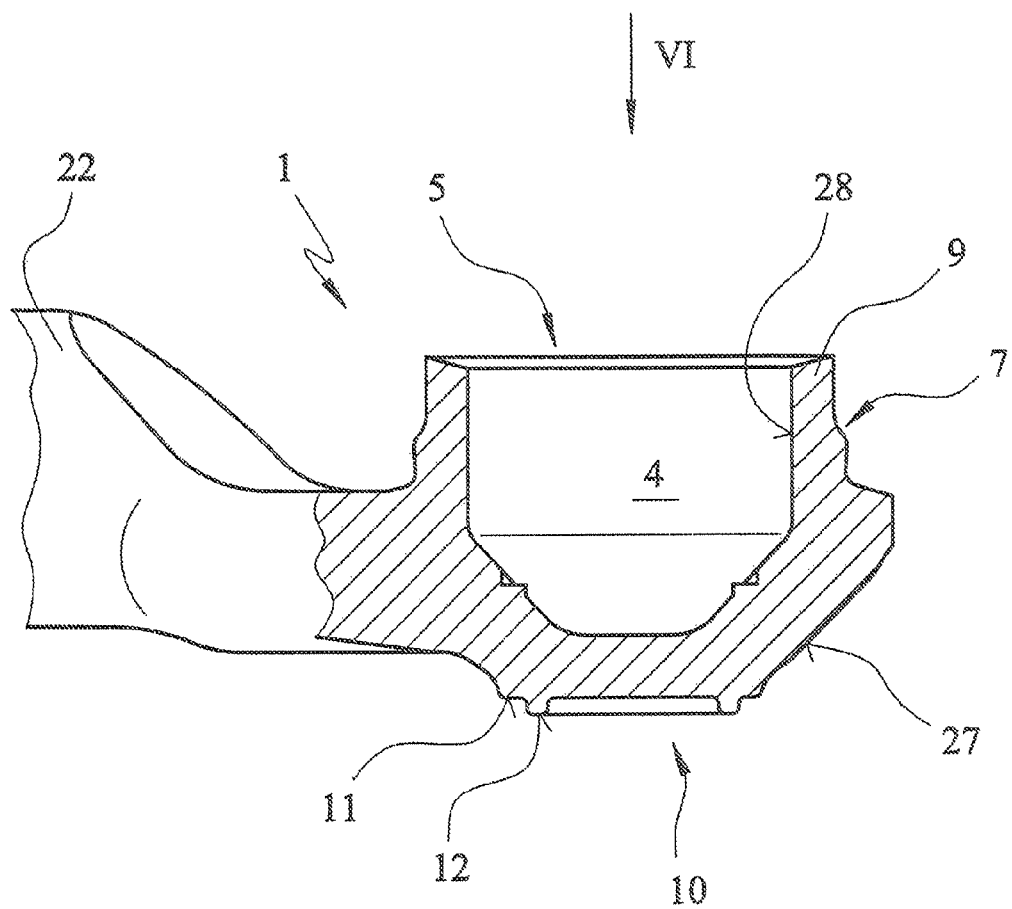
FIG. 5: a second variant of the housing as a single part and in partial section.

In contrast to the housing 1 presented FIG. 4, which is essentially identical, the housing 1 presented in FIG. 5 is equipped with a tool contact surface 11 and an annular adjustment flange 12 at its lower surface 10.

Figure 6:
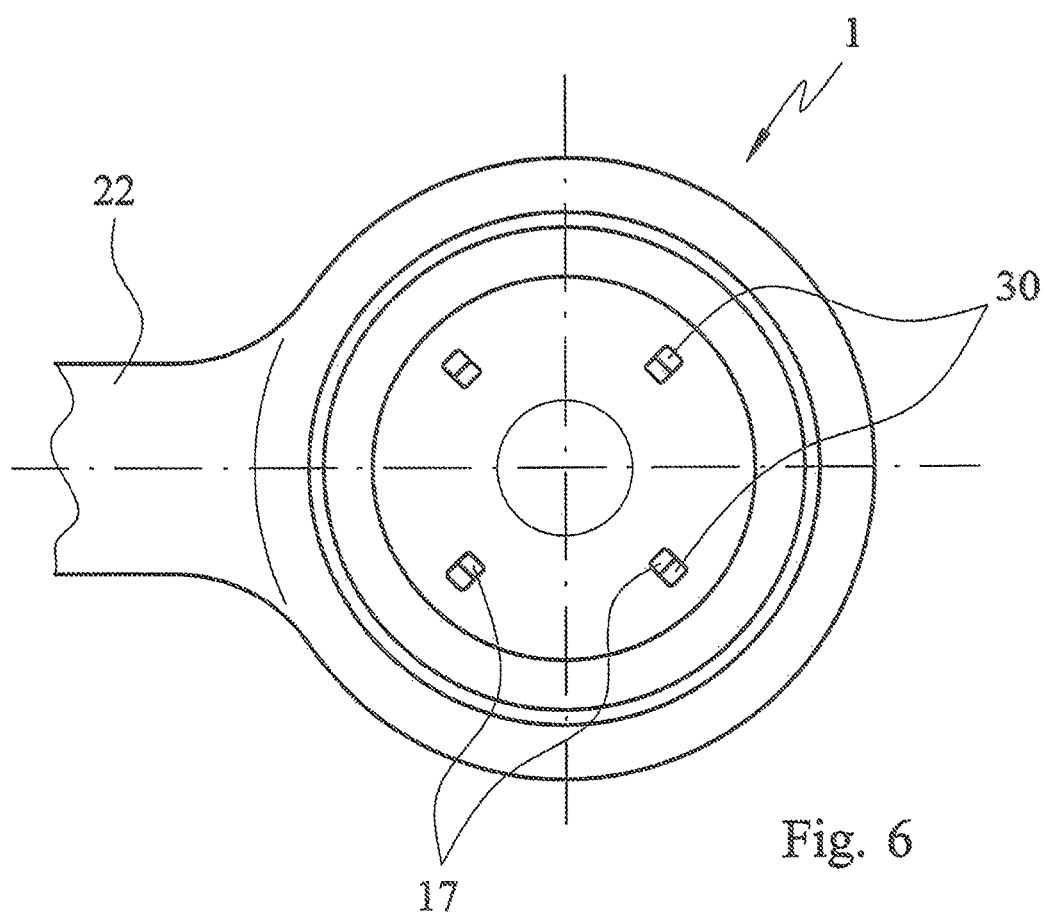
FIG. 6: the view in the direction of the arrow VI in FIG. 5 in the housing.

FIG. 6 shows a view of the inner chamber 4 of the housing 1 as a single component, corresponding to the arrow VI in FIG. 5. Recognizable in the image are the recesses 30 from which material was displaced for the formation of the projections 17 during the production of the housing. The shaft 22 is formed as a single unit on the side of the housing 1.

Figure 7:
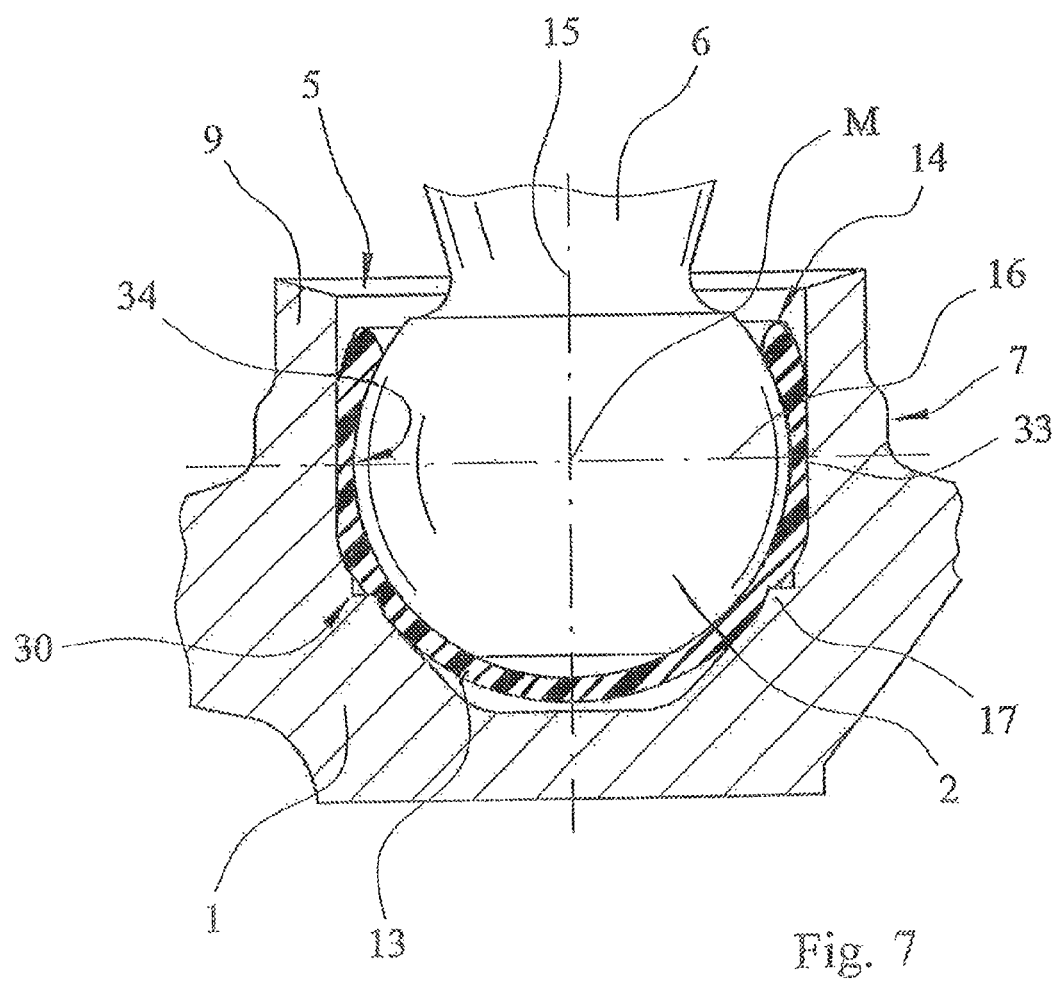
FIG. 7: a partial assembly of a ball joint according to the present invention in cross section.

FIG. 7 shows a cross section of a partial assembly of a ball joint according to the present invention for an embodiment of a ball joint according to the invention. The bearing shell 13 and the ball pin 3 are inserted into the open, unshaped housing 1 in FIG. 7, wherein the forming section 9 of the housing 1 has a circular-cylindrical shape. The bearing shell 13 receives the rotating and pivoting joint ball 2 of the ball pin 3 with its spheroid bearing surface and features a stronger material cross section in the area of its opening edge 14 than in a section, through which a plane 16 extends through the midpoint M of the joint ball 2 and perpendicular to the longitudinal axis 15 of the non-deflected ball pin 3. In other words, the bearing shell 13 features a bearing shell section 33 in the area of the equator of the joint ball 2, which is thinner than the opening edge 14 where the bearing shell 13 has a bead-like thickness. Recesses 34 of the bearing shell 13 can be filled with lubrication and have the additional advantage that they effect a reduction in friction between the joint ball 2 and the bearing shell 13.

In the inner chamber 4 of the housing 1, there are also projections 17 formed in the surface of the inner chamber 4 which are created by deforming the material during the production of the housing 1. This involves a displacement of material so that, in the illustration in FIG. 7, housing material that originates in the recesses 30 forms the projections 17.

Figure 8:
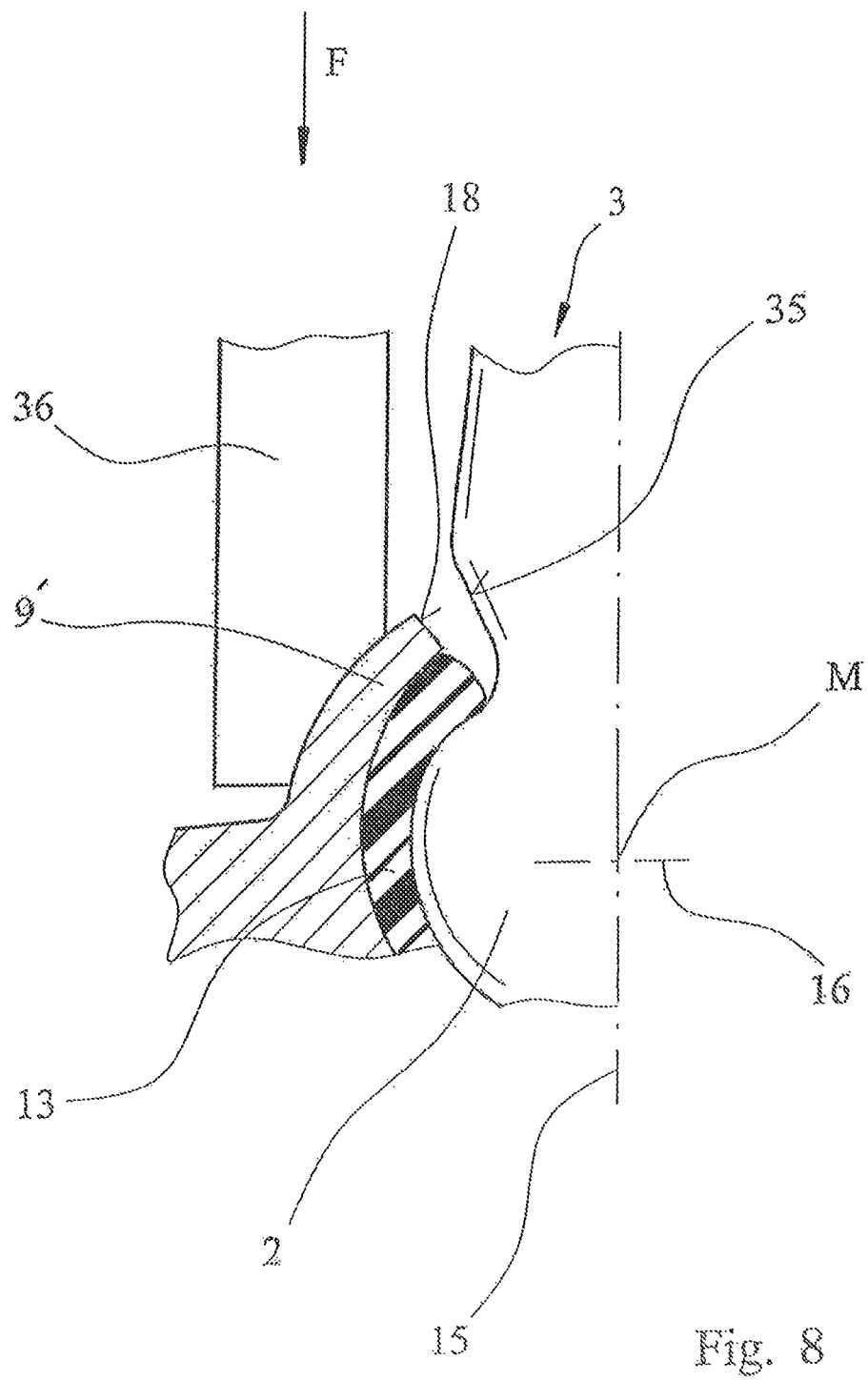
FIG. 8: simplifies the shaping of the forming section for closing the housing.

FIG. 8 is a greatly simplified representation showing the shaping of the forming section or joint closure 9' of the housing 1. A pressing tool 36 is used for cold forming the original circular-cylindrical forming section, which exerts a force "F", symbolized by an arrow, on the forming section 9. A portion of the pressing tool 36 displays the later contour of the outer contour 27 of the housing 1. In this example, the joint closure 9', formed from the forming section 9, has a spheroid shape both inside and outside. This has the advantage that the bearing shell 13 is located against the joint ball 2 and no sharp transitions arise. There is also a special feature in the fact that the joint closure 9' of the housing 1 has a beveled edge 18 on the side of the opening. This beveled edge 18, which corresponds to a seating shoulder 35 on the pin portion 6 of the ball pin 3, means that there is a linear contact to the housing 1 at a maximum deflection to one side of the ball pin 3. As compared with a point of contact, this linear contact has the advantage of having a very low notch effect so that the surface of ball pin 3 is not damaged even in the case of repeated contact. There is, however, an additional advantage to the spheroid shape of the joint closure 9'. In this way it is possible to shape the closure area of the joint closure 9' up to the transition area between the joint ball 2 and pin portion 6, in other words up to the stem neck, when the ball joint is closed so that a very high pullout resistance can be achieved. In other words, the diameter of the pin portion 6 of the ball pin 3 can be larger than the final diameter of the opening 5 of the housing 1. This option will not be feasible in ball joints that have a housing that is open at both ends and that is closed by a cover since in this case, the ball pin must be introduced into the housing on the cover side and therefore must be passed through the opening in the housing that is on the side opposite the cover-side. The diameter of the pin portion of the ball pin is therefore always smaller than the final diameter of the opening on the housing in ball joints that are open on both sides.

Figure 9:
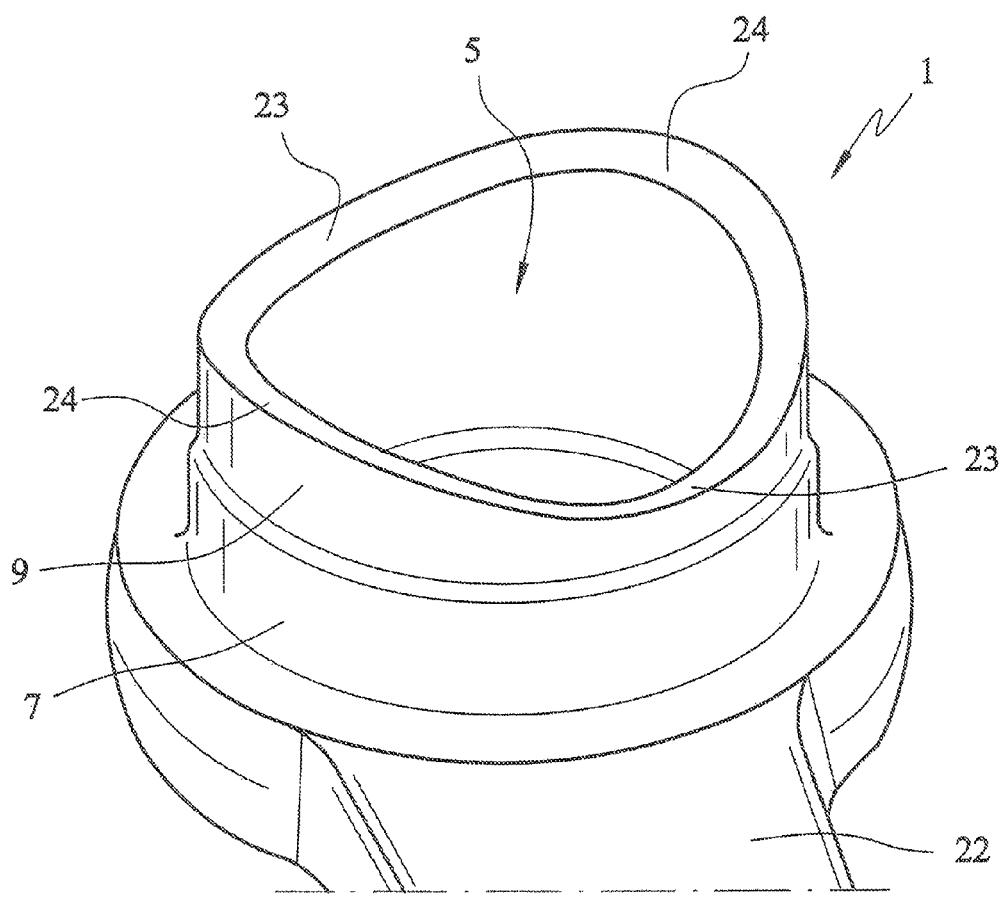
FIG. 9: a housing as a single component for a special embodiment of a ball joint and FIGS. 10a)-10d): a simplified sequence of operations drawing to represent the manufacture of the housing through cold forming.

FIG. 9 shows a special embodiment of a housing 1. This housing construction 1 makes a slot feasible as an opening 5 after its completion in the top view, through which the pin portion 6 of the ball pin 3 extends. In order to develop the slot in a single production step when shaping the forming section 9, the housing in FIG. 9 features two opposing, recessed edge sections 23 and a raised edge section 24 of the forming section 9 between these. This housing 1 also has the contact area 7 for the sealing bellows edge 8 below the forming section 9.

Figure 10A:
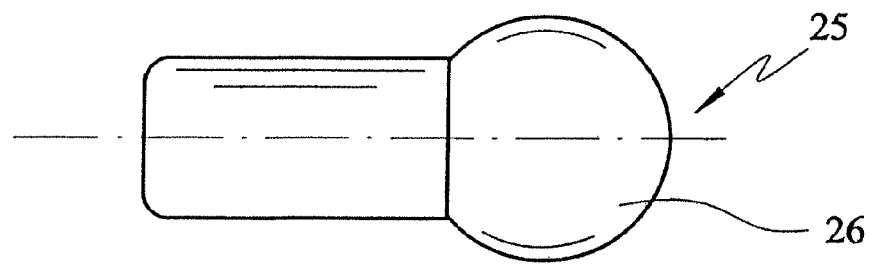

The method to which the invention relates is explained below using the highly simplified sequence of operations drawing in FIGS. 10*a*)-10*d*). First a metallic housing blank 25 is produced with a thickening 26 formed by compression, as show of FIG. 10*a*).

Figure 10B:
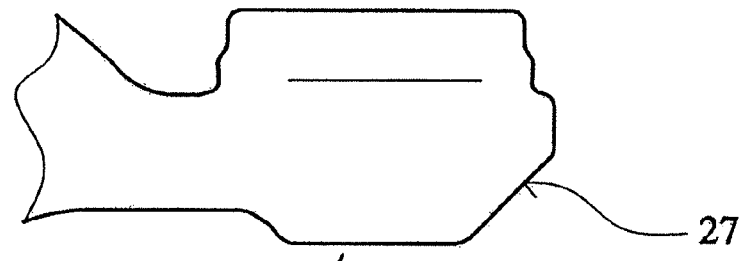

Following this, an outer contour 27 is created on the housing blank 25 by compression, as shown in FIG. 10*b*), which largely corresponds to the final outer contour of the housing 27 with the exception of a calibration which may be needed under certain circumstances.

Figure 10C:
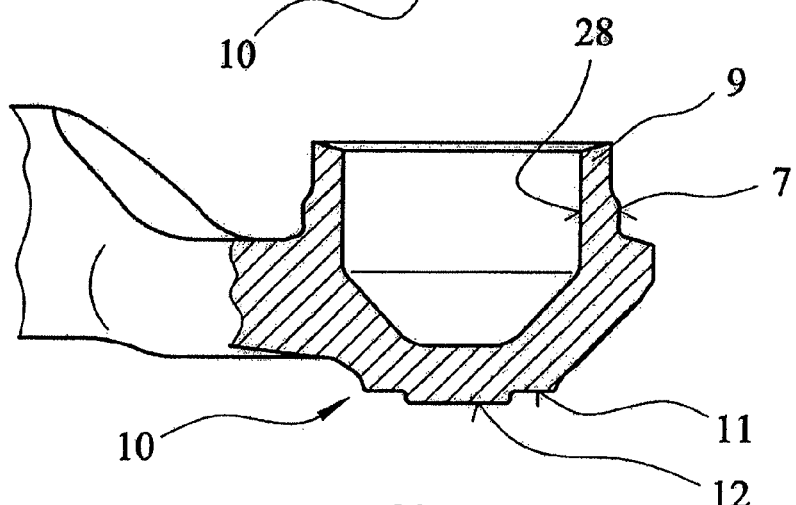
Figure 10D:
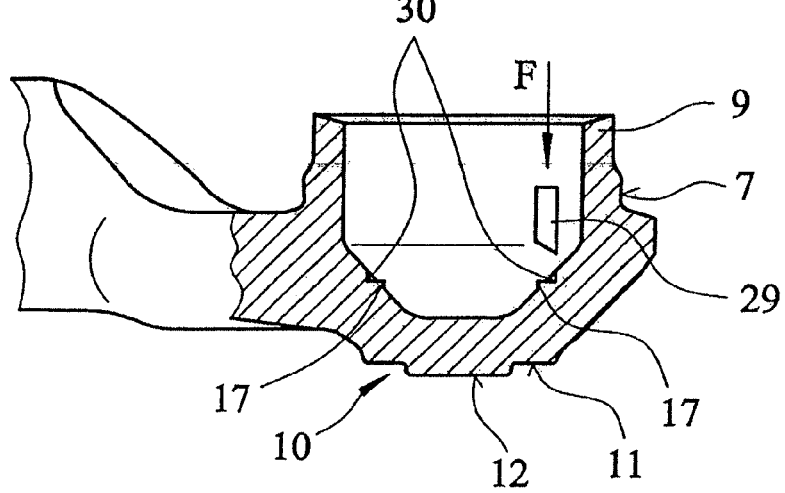

Dishing is the preferred method used for shaping the inner contour of the housing 28 whereby the displaced material is used to create the forming section 9. A tool contact surface 11 and an adjustment flange 12 are also formed on the lower surface 10 of the housing 1 during this operation, as shown in FIG. 10*c*).

The housing 1 is completed when projections 17 are carved out using a tool 29 in the inner chamber 4, which acts to prevent the bearing shell from rotating in the completely assembled ball joint. The projections 17 are created using simple material stripping.

The creation of the ball joint using the previously produced housing is done in additional separate steps:

Shaping of the inner contour of the housing 28 through cold forming, whereby the material displaced by the cold forming method forms a sealing bellows edge 8 and a forming section 9 in such a way that a circumferential closure area 9 is formed, Attachment of a bearing shell 13 to the joint ball 2, Insertion of the joint ball of the ball pin in the inner chamber 4, Closing the joint by cold forming the closure area 9 in such a way that a joint closure 9 is created.

REFERENCE CHARACTER LIST

1 Housing, housing head
2 Joint ball
3 Ball pin
4 Inner chamber
5 Angular deflection opening
6 Pin portion
7 Contact area
8 Sealing bellows edge
9 Forming section, closure area, joint closure
10 Lower surface
11 Tool contact surface
12 Adjustment flange
13 Bearing shell
14 Opening edge (of the bearing shell)

15 Longitudinal axis
16 Plane
17 Projection
18 Beveled edge
19 Transition area
20 Axial section
21 Slope section
22 Shaft
23 Recessed edge section
24 Raised edge section
25 Housing blank
26 Thickening
27 Outer contour of the housing
28 Inner contour of the housing
29 Tool
30 Recess
31 Sealing bellows
32 Sealing bellows edge
33 Bearing shell section with reduced material cross section
34 Recess
35 Seating shoulder
36 Pressing tool

The invention claimed is:

1. A ball joint with a joint housing (1), that includes an inner chamber (4) that houses a joint ball (2) of a ball pin (3), as well as an opening (5), on one side, to facilitate passage of the joint ball (2) therethrough, whereby the joint bail has an attached pin portion (6) of the ball pin (3);
   a contact area (7) disposed on an outer surface of the housing (1) which forms a seal with an edge (8) of a sealing bellows (31);
   an integrated joint closure (9') formed on the housing (1), for securing the joint ball (2) of the ball pin (3) within the inner chamber (4) so that the joint ball (2) can both rotate and pivot;
   a closure area (9') being formed by a forming section, following insertion of the ball pin (3) in the inner chamber (4);
   the closure area, shaped by a cold forming method, forms the joint closure (9') after the assembly of the ball joint;
   a bearing shell (13) is inserted into the inner chamber (4) of the housing (1);
   an inner surface of the bearing shell defining a sphere having an opening on one side;
   a plane (16) extending through a midpoint (M) of the joint ball (2) and perpendicular to a longitudinal axis (15) of a non-deflected bah pin (3); and
   the contact area (7) comprising an axial section (20) and a slope section (21) which both engage with an end of the sealing bellows extending radially outward from a part of the sealing bellows adjacent the end thereof, the plane (16) is coincident with both the end of the sealing bellows and with the axial section (20) of the contact area (7), at substantially an axial mid-point of the axial section (20).

2. The joint housing according to claim 1, wherein the closure area (9') has a hollow, circular cylinder, taper or cone geometry.

3. The joint housing according to claim 1, wherein the joint closure (9') has a substantially spheroid shape.

4. The joint housing according to claim 1, wherein the housing (1) has, opposite the opening (5), a tool contact surface (11) on a lower surface (10) thereof.

5. The joint housing according to claim 1, wherein the housing (1) has, opposite the opening (5), an adjustment flange (12) on a lower surface (10) that is formed from displaced material during a cold forming process.

6. The joint housing according to claim 5, wherein the adjustment flange (12) comprises one of an annular, a circular and a polygonal projection.

7. The joint housing according to claim 1, wherein the bearing shell (13) has only a single opening.

8. The joint housing according to claim 7, wherein the bearing shell (13) has a substantially constant wall thickness and has a generally spheroid shape before insertion of the joint ball (2) into the bearing shell (13).

9. The joint housing according to claim 7, wherein the bearing shell (13) has a stronger material cross section in an area of an opening edge (14) than in a section through which the plane (16) extends.

10. The joint housing according to claim 7, wherein the inner chamber (4) of the housing (1) has at least one projection (17) for preventing the bearing shell (13) from rotating.

11. The joint housing according to claim 1, wherein the forming section (9) of the housing (1) has a reduced material cross section in comparison to the contact area (7) for the sealing bellows edge (8).

12. The joint housing according to claim 1, wherein an outer diameter of the forming section (9) is smaller than an outer diameter of the contact area (7) for engaging with the edge (8) of the sealing bellows.

13. The joint housing according to claim 1, wherein the closure area (9') of the housing (1) has a beveled edge (18) that forms an edge of the opening (5), following shaping of the ball joint, which corresponds to a geometry of the pin portion (6) of the ball pin (3) in this area.

14. The joint housing according to claim 1, wherein a transition area (19) is provided between the forming section (9) and the contact area (7).

15. The joint housing according to claim 14, wherein the transition area (19) is formed by at least one radius.

16. The joint housing according to claim 14, wherein the transition area (19) is formed by multiple radii that merge with one another.

17. The joint housing according to claim 1, wherein the contact area (7) for the edge (8) of the sealing bellows features a circular-cylindrical, tapered or conical shape.

18. The joint housing according to claim 1, wherein the housing (1) is of unitary construction and the inner chamber (4) of the unitary housing (1) completely surrounds a leading end of the joint ball (2), following insertion of the joint ball (2) into the inner chamber (4).

19. The joint housing according to claim 18, wherein the contact area (7) for the sealing bellows edge (8) of the sealing bellows is substantially parallel to the longitudinal axis (15) of the non-deflected ball pin (3) or encompasses an acute angle of between 0°-5°, and the contact area (7) also has a slope section (21) that slopes away from the inner chamber (4).

20. The joint housing according to claim 1, wherein a shaft (22) is attached to the housing (1) by one of welding and deformation of the material being displaced by the cold forming.

21. The joint housing according to claim 1, wherein the opening (5) of the housing (1) is shaped as a slot.

22. The joint housing according to claim 1, wherein the forming section (9) of the housing (1) has two diametrically opposed recessed edge sections (23) and a raised edge section (24) located between the recessed edge sections (23).

23. A bail joint with a joint housing, that includes an inner chamber that houses a joint ball of a ball pin, as well as an opening, on one side, to facilitate passage of the joint ball therethrough, whereby the joint ball has an attached pin portion of the ball pin;

an outer surface of the housing having a contact area which forms a seal with an end of a sealing bellows;

an integrated joint closure formed on the housing, for securing the joint ball of the ball pin within the inner chamber so that the joint ball is both rotatable and pivotable;

a closure area being formed by a forming section, following insertion of the ball pin in the inner chamber, the closure area, shaped by a cold forming method, forms the joint closure after the assembly of the ball joint;

a bearing shell is inserted into the inner chamber of the housing, an inner surface of the bearing shell defining a sphere having an opening on one side;

a plane extending through a midpoint of the joint ball and perpendicular to a longitudinal axis of a non-deflected ball pin;

the end of the sealing bellows extending radially outward from a part of the sealing bellows adjacent the end thereof; and the contact area comprising an axial section and a slope section which both engage with the end of the sealing bellows, the plane is coincident with both the end of the sealing bellows and the contact area on the outer surface of the housing, at substantially an axial mid-point of the axial section.

24. The ball joint with the joint housing according to claim 23, wherein the end of the sealing bellows comprises an axially extending surface and a radially extending surface, the radially extending surface of the end of the sealing bellows engages the slope section of the contact area, the axially extending surface of the end of the sealing bellows engages the axial section of the contact area, and the plane is coincident with both the axial section of the contact area and the axially extending surface of the end of the sealing bellows.

25. A ball joint assembly comprising a joint housing and a ball pin, the joint housing comprises a wall that defines an inner chamber and has an axial section and a forming section, the forming section defines an opening of the inner chamber, the inner chamber of the housing receives a bearing shell through the opening, the ball pin defines a longitudinal axis and comprises a joint ball and a pin portion that is attached to the joint ball, the joint ball is received by the bearing shell within the inner chamber through the opening thereof;

prior to formation of the ball joint assembly, the axial and the forming sections of the wall are cylindrical and define an axis that is collinear with the longitudinal axis of a non-deflected ball pin, and the forming section of the wall has a radial thickness that is smaller than a radial thickness of the axial section of the wall; the forming section of the wall of the housing being deflected, to form the ball joint assembly, by a cold forming method such that the forming section is progressively deflected toward the longitudinal axis of the non-deflected ball pin from adjacent the axial section to the opening of the inner chamber;

after formation of the ball joint assembly an inner surface of the bearing shell defines a sphere and the joint ball is fixed axially and radially and is rotatable and pivotable in relation to the housing;

the axial section of the wall of the housing engages an end of a sealing bellows forming a seal therebetween, the end of the sealing bellows extends radially outward from an adjacent part of the sealing bellows to which the end is attached; and a plane extending through a midpoint of the joint ball and perpendicular to the longitudinal axis of the non-deflected ball pin is coincident with the axial section of the wall of the housing at substantially an axial mid-point of the axial section and with the radially extending end of the sealing bellows.

* * * * *